(12) United States Patent
Liu

(10) Patent No.: US 7,270,244 B1
(45) Date of Patent: Sep. 18, 2007

(54) POLYCARBONATE DOUBLE WALLED LIQUID HOLDING VESSEL

(75) Inventor: Alex L. Liu, Lake Oswego, OR (US)

(73) Assignee: Pacific Cornetta, Inc., Wilsonville, OR (US)

( * ) Notice: Subject to any disclaimer, the term of this patent is extended or adjusted under 35 U.S.C. 154(b) by 106 days.

(21) Appl. No.: 10/763,781

(22) Filed: Jan. 22, 2004

(51) Int. Cl.
*A47J 47/02* (2006.01)

(52) U.S. Cl. .................. 215/13.1; 220/592.27

(58) Field of Classification Search .......... 215/12.1, 215/13.1, 306; 220/592.17, 592.35, 592.15, 220/592.16, 592.27, 62.18, 62.22, 375, 62.16
See application file for complete search history.

(56) References Cited

U.S. PATENT DOCUMENTS

| | | | | |
|---|---|---|---|---|
| 2,715,326 A | * | 8/1955 | Gits ........................ | 215/12.1 |
| 2,895,636 A | * | 7/1959 | Martin ...................... | 220/574 |
| 3,304,603 A | * | 2/1967 | Piker ........................ | 29/416 |
| 4,301,942 A | * | 11/1981 | Kupperman et al. ... | 220/592.17 |
| 4,341,316 A | * | 7/1982 | Bunge ....................... | 215/13.1 |
| 4,811,858 A | * | 3/1989 | Augur ....................... | 215/13.1 |
| 4,823,974 A | * | 4/1989 | Crosser .................... | 62/457.3 |
| 5,038,948 A | * | 8/1991 | Signorini ................. | 215/11.1 |
| 5,094,363 A | * | 3/1992 | Monahan et al. ........ | 222/131 |
| 5,111,975 A | * | 5/1992 | Roberts .................... | 222/475.1 |
| D326,586 S | * | 6/1992 | Embree ..................... | D7/510 |
| 5,133,469 A | * | 7/1992 | Mehta et al. ............. | 215/10 |
| 5,221,016 A | * | 6/1993 | Karpal ...................... | 215/12.2 |
| 5,282,541 A | * | 2/1994 | Chen ......................... | 215/229 |
| 5,329,778 A | * | 7/1994 | Padamsee ................. | 62/56 |
| 5,447,248 A | | 9/1995 | Rodriguez | |
| D363,641 S | * | 10/1995 | Goto et al. ............... | D7/511 |
| 5,515,995 A | * | 5/1996 | Allen et al. ............. | 220/592.16 |
| 5,642,831 A | * | 7/1997 | Lynd ......................... | 220/8 |
| 5,678,725 A | * | 10/1997 | Yamada et al. .......... | 220/592.21 |
| 5,894,948 A | | 4/1999 | Yeh | |
| 5,913,445 A | * | 6/1999 | Fujii et al. ............... | 220/574 |
| 5,960,998 A | * | 10/1999 | Brown ....................... | 222/131 |
| D420,254 S | * | 2/2000 | Park ........................... | D7/510 |
| 6,119,888 A | * | 9/2000 | Goto et al. ............... | 220/592.27 |
| 6,164,469 A | | 12/2000 | Sartore | |
| D455,610 S | * | 4/2002 | Bridges ..................... | D7/536 |
| 2002/0000419 A1 | * | 1/2002 | Mueller .................... | 215/13.1 |
| 2002/0134903 A1 | * | 9/2002 | Lin ............................ | 248/346.11 |
| 2003/0076673 A1 | * | 4/2003 | Diak/Ghanem ........... | 362/101 |

FOREIGN PATENT DOCUMENTS

DE 3534103 A1 * 4/1987
JP 6485619 * 3/1989

OTHER PUBLICATIONS

Bodum—Travel Tumbler. Web page Jan. 22, 2004.
Bodum—Travel Press. Web page Jan. 22, 2004.

* cited by examiner

*Primary Examiner*—Sue A. Weaver
(74) *Attorney, Agent, or Firm*—Steven J. Adamson

(57) ABSTRACT

A double walled polycarbonate liquid holding vessel. The vessel may have an inner wall and an outer wall that are coupled to each other in a manner that defines an air tight gap therebetween. A resealable unit may be provided with the vessel that permits resealable access to the interior of the inner wall. The outer wall may be multi-section or single section, and various techniques may be used to conceal joints used to mount the outer wall to the remainder of the vessel. Various embodiments are disclosed.

20 Claims, 3 Drawing Sheets

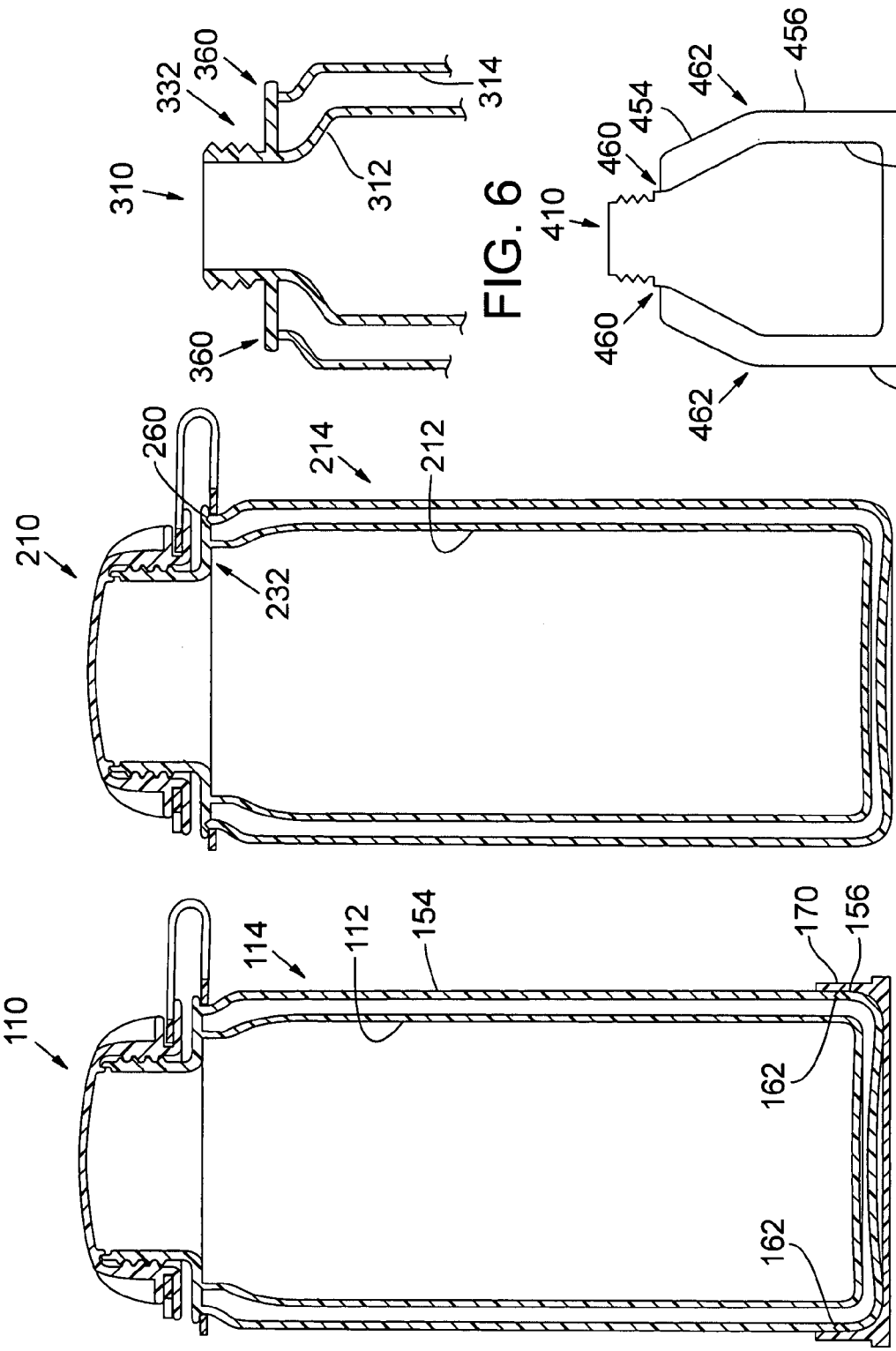

POLYCARBONATE DOUBLE WALLED LIQUID HOLDING VESSEL

FIELD OF THE INVENTION

The present invention relates to double walled plastic vessels for holding and/or storing liquids. More specifically, the present invention relates to such vessels that are formed of a durable, substantially transparent material.

BACKGROUND OF THE INVENTION

The prior art includes various double-walled plastic vessels, both resealable and non-resealable. Resealable examples include thermoses and like containers. Non-resealable examples include various double-walled tea and coffee cups (i.e., tumblers) and related items.

The prior art also includes transparent liquid holding vessels. These include a wide range of containers often formed of any of the standard commercial plastics. Examples include clear plastic soda and fruit juice bottles, soup and other liquid containers, and water bottles. Polyethylene terephthalate is an example of a plastic used to fabricate single use water bottles.

Higher end water bottles and like devices are known that are made of a polycarbonate resin sheet material. Polycarbonate is favored in some applications because it exhibits resistance to odors and flavors and thus different tasting beverages can be placed in a container with less likelihood of a taste "memory" from the previous beverage. Polycarbonate resin sheet material is also relatively durable compared to many conventional beverage container plastics. One commercial source of polycarbonate is General Electric which sells this material under the trade name "Lexan." Nalgene is one maker of water bottles and laboratory equipment that are made of single walled polycarbonate.

Notwithstanding the benefits of polycarbonate, it is disadvantageous, among other reasons, in that it is relatively difficult to work with. It tends to be more viscous and rigid than other plastics and joining two components made of polycarbonate typically requires a weld that is unsightly.

Furthermore, relative to other types of beverage container plastic, the polycarbonate raw material is expensive. Coupling the material cost with the elevated cost of manufacture (associated with the difficulty in working with polycarbonate) renders polycarbonate products disadvantageously expensive.

Accordingly, due to problems associated with cost of material, difficulty in manufacturing, joining components and/or hiding unsightly joints, etc., prior art vessels using polycarbonate have been limited to single wall vessels or double walled vessels with only a single wall of polycarbonate material. The benefits of having a double walled polycarbonate vessel, for example, durability, insulating, transparent, non-odor absorbing, potentially microwave-able, etc., are not realized.

A need thus exists for a double walled polycarbonate liquid holding vessel that overcomes the deficiencies of the prior art and achieves some or all of the above stated benefits. A need further exists for a double walled polycarbonate liquid holding vessel that is resealable and at least in part transparent.

SUMMARY OF THE INVENTION

The present invention may be realized in several different embodiments and is not limited to the specific embodiments illustrated herein.

In one embodiment, the present invention includes a inner wall and an outer wall that are both formed of polycarbonate material. These walls are separated at least in part by an insulative gap. The inner and outer walls may be coupled to a resealable unit that may include a base and resealable lid or other resealable element. The inner and outer walls may couple directly to this unit.

The inner and/or outer wall may be formed of transparent polycarbonate to permit inspection of contents behind the wall. If both the inner and outer wall are transparent, then the contents of the vessel are visible. A transparent outer wall permits inspection of printing or aesthetic patterning on the exterior surface of the inner wall or on an insert provided between the inner and outer walls.

The outer wall can be multi-part to permit more aesthetic shaping of the vessel, including a taper towards the top or another shape, and/or the inclusion of other members that provide an desired aesthetic feature or provide a different printable surface or other marking or the like.

Beneficial features on the present invention include that the resultant vessel is durable (and resists scratches), insulative, non-metallic (i.e., potentially microwave-able), non-odor absorbing and may be configured to provide an outwardly disposed printable surface or surfaces, among others beneficial features.

The attainment of the foregoing and related advantages and features of the present invention should be more readily apparent to those skilled in the art, after review of the following more detailed description of the invention taken together with the drawings.

BRIEF DESCRIPTION OF THE DRAWINGS

FIGS. 4-7 are cross-sectional views (in whole or part) of other embodiments of a polycarbonate double walled liquid holding vessel in accordance with the present invention.

DETAILED DESCRIPTION

Figure 1:
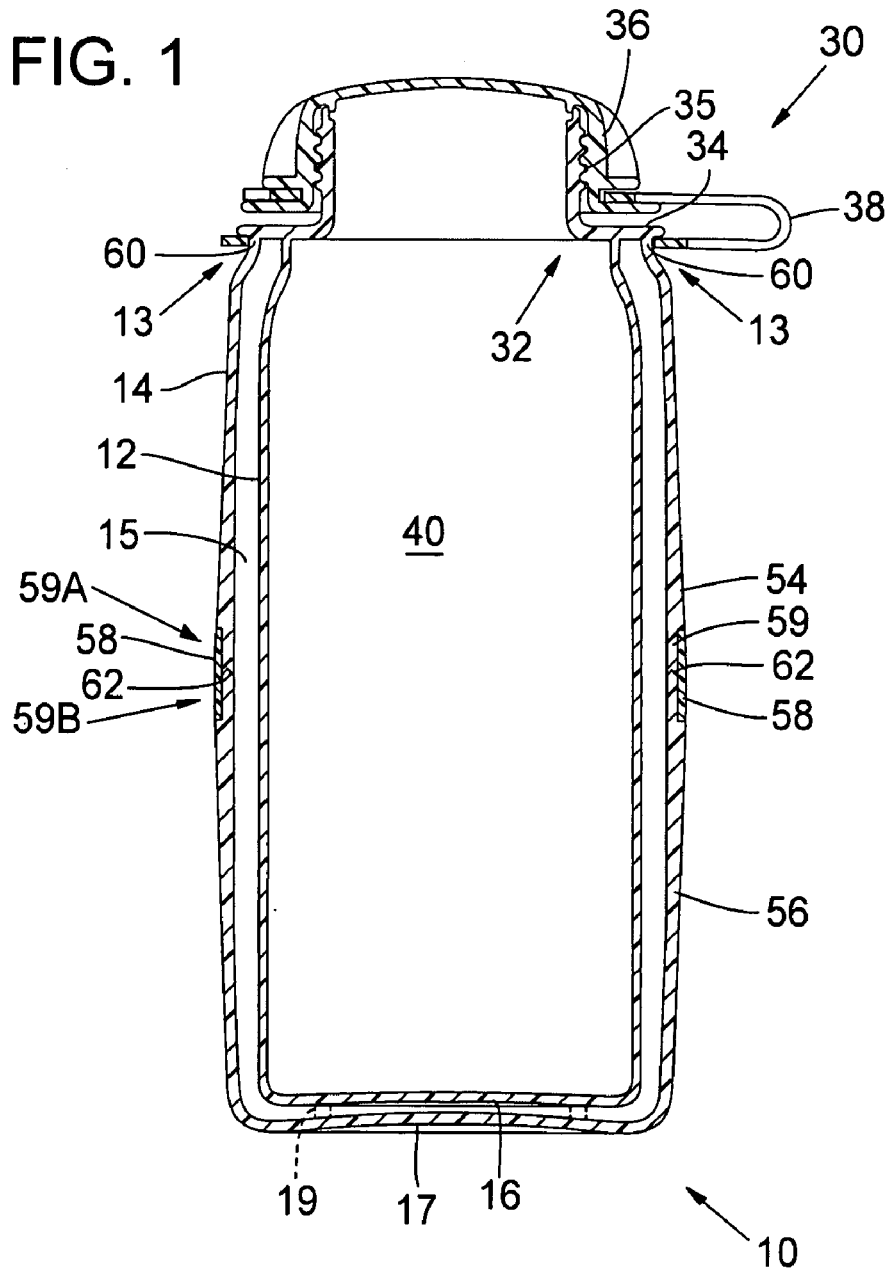
FIG. 1 is a cross-sectional side view of a polycarbonate double walled liquid holding vessel in accordance with the present invention.

Referring to FIG. 1, a cross sectional side view of a polycarbonate double walled liquid holding vessel in accordance with the present invention is shown. From a top plan view, vessel 10 may be substantially round, though it should be recognized that vessel 10 may have any shape in top plan view, e.g., square, rectangular, polygonal, elliptical, amorphous or any other shape, without departing from the present invention.

Vessel 10 may include an inner wall 12 and an outer wall 14. These walls 12,14 are preferably separated at least in part by a gap 15 that provides an insulative function. Gap 15 may contain only air or another substances such as foam, or any gaseous, liquid or solid material. Inner wall 12 and outer wall 14 are preferably sealed in an air-tight manner such that gap 15 is air-tight. Both inner wall 12 and outer wall 14 may respectively include bottoms 16,17 which may be formed integrally or otherwise. The bottoms 16,17 may be inter-coupled or spaced in a manner that maintains a continuous gap therebetween. Inter-coupling may be achieved through a variety of mounting structures including a ring 19 (shown in phantom lines) mounted to each bottom, or a plurality of "leg" members or an "X" or other geometrically shaped structure (from a top perspective), etc. The inter-coupling member(s) 19 serve(s) to provide enhanced stability to the double walled arrangement of device 10 (or the other devices herein, in addition to the welds ending in "60" discussed below).

Inner wall 12 is preferably formed of a polycarbonate resin sheet material such as Lexan or another suitable polycarbonate or polycarbonate-like material. The polycarbonate may be transparent (such that it can be readily seen through), translucent or partially to fully opaque. It is preferably transparent to permit visual inspection of the contents within, though it may be formed otherwise to achieve a desired appearance or function (e.g., reflective to reduce solar heating or dark to facilitate same, etc.). Outer wall 14 may also be formed of a polycarbonate resin sheet material or the like with the same or similar characteristics to those of inner wall 12. The provision of a transparent polycarbonate material for the inner and outer walls permits visual inspection of the contents of vessel 10.

Inner wall 12 and outer wall 14 are preferably attached to a resealable unit 30 that permits resealable access to cavity 40 inside inner wall 12. Unit 30 may include a base 32 having an annular member 34 and a threaded neck 35 (or another suitable arrangement). A cap 36 may be threaded onto neck 35. Note that while cap 36 is preferably threaded it may be resealable joined by other mechanisms including, but not limited to, snap-on, slide-on, a clamp, etc. Cap 36 may be moveably tethered to vessel 10 by leash 38. Cap tethering arrangements are known in the art.

The inner and outer walls 12,14 are preferably coupled to base 32 of resealable unit 30, though they may be otherwise coupled. Inner wall 12 is preferably formed integrally with base 32. Known fabrication techniques for integral formation of these components, including an air-blow based fabrication of inner wall 12, are generally known in the art.

Outer wall 14 is also coupled to resealable unit 30. This may be achieved by coupling outer wall 14 to base 32 via a weld 60. This weld is preferably formed by a sonic weld. Sonic welding is known in the art. Other joining techniques, however, may be used and these include, but are not limited to, glue, compression, threading (for example, a threaded outer wall could be removed for cleaning), etc. The upper region or collar 13 of outer wall 14 (and of inner wall 12) may be indented, particularly relative to base 32, such that the typically unsightly weld 60 is substantially hidden underneath the base.

Outer wall 14 may also include a second weld. In the embodiment of FIG. 1, outer wall 14 may be formed of two sections 54,56. The provision of two or more sections provides more opportunity for modifying the aesthetic features (shape, appearance, etc.) of the vessel. The provision of two or more sections can also be done in a manner that permits the inclusion of other surfaces or substrates, for example, to enhance function, aesthetics or to otherwise mark or distinguish the vessel.

In the embodiment of FIG. 1, sections 54,56 are each approximately one-half of the height of the outer wall, but could be otherwise arranged. The sections 54,56 are preferably welded together at weld 62 which may be a sonic weld as discussed above for weld 60. A bottom portion 59A of top section 54 and a top portion 59B of bottom section 56 may be indented proximate second weld 62 to accommodate a band 58. Band 58 may provide one or more of the following functions. It may hide weld 62, be made of a material that facilitates a better grip by a user, be an additional substrate for printing or engraving, provide a desired aesthetic feature, support a logo or other type of commercial or personal marking, etc.

Gap 15 between the inner and outer walls may be continuous or discontinuous. A continuous gap is one that is substantially free of members or other structures that connect the inner wall to the outer wall. While these members enhance structural integrity, they may conduct cold (or heat) away from the inner wall towards the outer wall and hence compromise the thermal insulative properties of the vessel. Gap 15 is preferably continuous, but may be made otherwise without departing from the present invention.

Figure 2A:
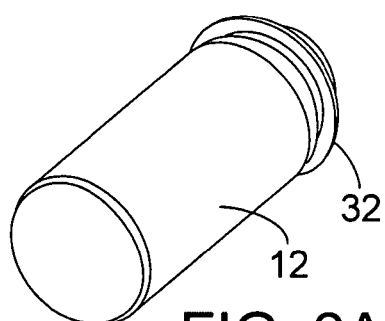
FIGS. 2A-2D are a series of perspective views of component parts of the polycarbonate double walled liquid holding vessel of FIG. 1.
Figure 2B:
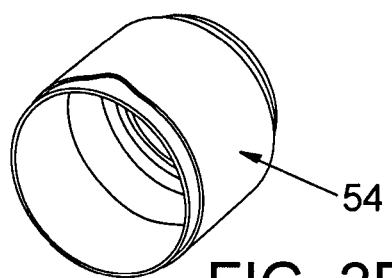
Figure 2C:
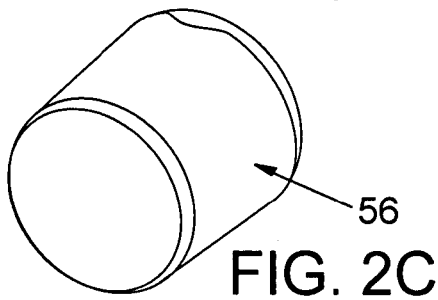
Figure 2D:
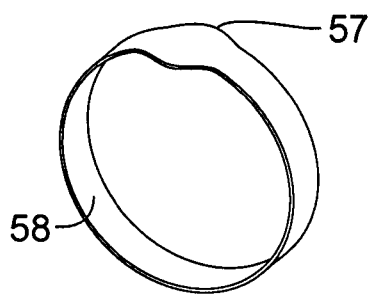

Referring to FIGS. 2A-2D, a series of perspective views that illustrate aspects of manufacturing a polycarbonate double walled vessel in accordance with the present invention are shown. FIG. 2A illustrates inner wall 12 with base 32 formed integrally therewith. FIG. 2B illustrates top section 54 which is slid over the configuration of FIG. 2A and welded to the underside of base 32 (at weld 60 of FIG. 1). Bottom section 56, shown in FIG. 2C, is then slid over the remainder of inner wall 12 and welded to top section 54 (at weld 62 of FIG. 1). Band 58, shown in FIG. 2D, is then positioned into complementary recess 59 (formed in part in top section 54 and bottom section 56) to hide weld 62, among other potential reasons. Band 58 may include a design feature 57 such as an oval or other shaped section or substrate for printing on or for mounting/displaying an item (logo, etc.) or as otherwise alluded to herein. Band 58 may be made in whole or in part of an elastomeric material such as rubber or a rubber like material and is preferably stretched over bottom section 56 until it settles into recess 59, or can be otherwise constructed. Note that the supplemental surface member that is band 58 need not be elastomeric, may be mounted by glue, welding or other mounting means and may be differently shaped, etc.

Figure 3:
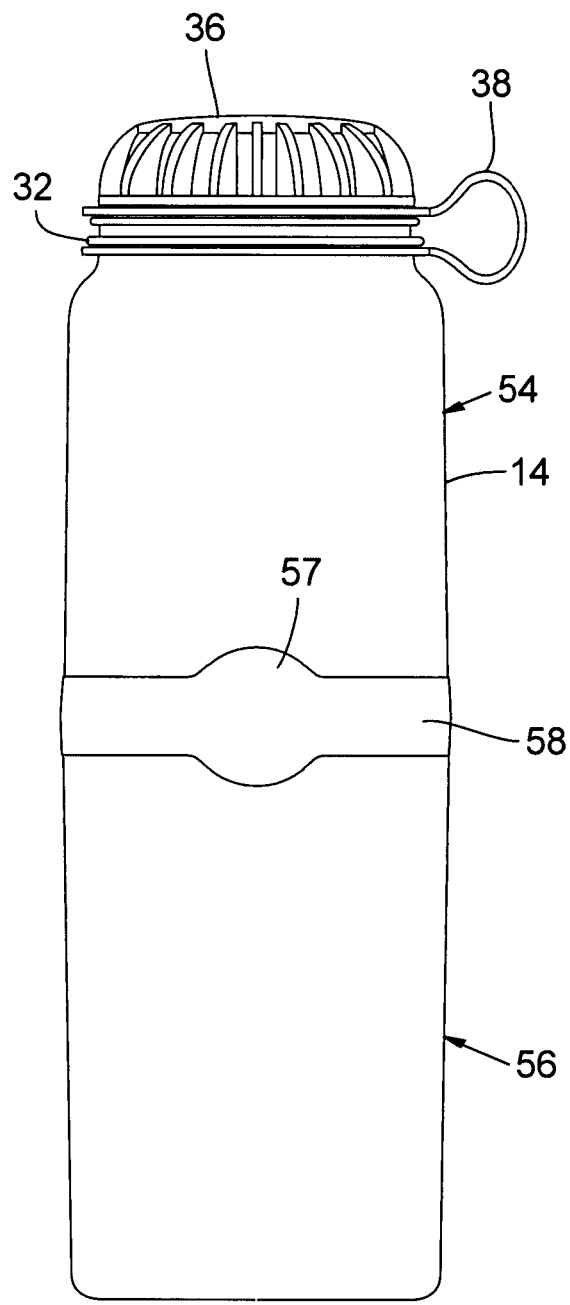
FIG. 3 is a side elevation view of the polycarbonate double walled liquid holding vessel of FIG. 1.

Referring to FIG. 3, a side elevation view of vessel 10 of FIG. 1 in accordance with the present invention is shown. FIG. 3 illustrates cap 36, base 32, leach 38, top section 54 and bottom section 56 (of outer wall 14), band 58 and design feature 57.

Referring to FIG. 4, a cross sectional side view of another polycarbonate double walled liquid holding vessel 110 in accordance with the present invention is shown. Vessel 110 is similar to vessel 10 of FIG. 1 (for example, inner wall 112 is preferably formed in the same manner as inner wall 12), yet the outer wall 114 includes a top section 154 that is relatively large compared to the bottom section 156, resulting in a weld 162 or other joint that is located towards the bottom of the vessel. While the top and bottom sections 154,156 could be configured to define a recess such as recess 59 of vessel 10 (to accommodate band 58), weld 162 may be sufficiently near the bottom of the vessel that a bottom piece 170, perhaps made of non-slip rubber or the like, can be provided in such a manner as to hide weld 162 and/or provide any of the other functions of band 58. The inner and outer walls 112,114 in this embodiment, between base 132 and bottom piece 170, may be uninterrupted, providing a continuous substrate for clear viewing or patterning, etc.

Referring to FIG. 5, a cross sectional side view of another polycarbonate double walled liquid holding vessel 210 in accordance with the present invention is shown. Vessel 210 may share many of the same features and components of vessel 10 of FIG. 1, for example, inner wall 212 may be formed in the same manner as inner wall 12 of FIG. 1. One difference is that the outer wall 214 of vessel 210 is preferably made of a singular piece of polycarbonate material as opposed to two sections (top and bottom sections 54,56) as in vessel 10. The singular piece outer wall 214, which is free of a weld such as weld 62, may present a smooth, unobstructed outward surface. Outer wall 214 is preferably mounted to vessel 210 by welding the top of outer wall 214 to base 232. A sonic weld such as weld 60 or other suitable joining means may be used. The embodiment of FIG. 5 potentially provides a double walled vessel with an unobstructed outer and inner wall 214,212.

Referring to FIG. 6, a cross-sectional side view of a portion of a double walled vessel liquid holding vessel 310 in accordance with the present invention is shown. FIG. 6 illustrates the upper portion of a vessel 310 in which the arrangement of base 332 and inner and outer walls 312, 314 is different from that of FIG. 1. Inner wall 312 has a more pronounced taper (than wall 12) and base 332 extends outward from a part near the end of the taper.

Outer wall 314 is joined to the underside of base 332, preferably by welding at 360 (like weld 60). Relatively, weld 360 is farther out on base 332 than weld 60 on base 32.

Referring to FIG. 7, a cross sectional side view of another polycarbonate double walled liquid holding vessel 410 in accordance with the present invention is shown. Vessel 410 may include an inner wall 412 and outer wall 414. The outer wall may be formed in two sections: a top section 454 and a bottom section 456. In contrast to the embodiment of FIG. 1, and other embodiments herein, the diameter of inner wall 412 towards a middle and lower region thereof is wider than the diameter of the outer wall 414 towards a top portion thereof. The configuration of vessel 410 may be achieve by fitting top section 454 over the top of the inner wall (in contrast to sliding it up from the bottom as was the preferred mounting method in the embodiments of FIGS. 1-6) and sliding bottom section 456 up from the bottom.

Top section 454 may be joined to inner wall 412 at weld 460 (which may be a sonic or other type of weld) and bottom section 456 may be joined to top section 454 at weld 462. Welds 460 and 462 may be sonic or another type of weld. The top and bottom sections 454,456 may be joined other than be welding.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A double walled liquid holding vessel, comprising:
   an inner wall having an attached bottom that is configured in such a manner as to define a cavity that holds liquid; and
   an outer wall provided about and substantially spaced from said inner wall to define an insulative gap between the inner and outer walls;
   wherein said inner wall and said outer wall are respectively coupled at top portions thereof to a base of a resealable unit, the coupling being by an air tight seal that renders said insulative gap air tight, said resealable unit including a threaded cap member that removably mounts to said base;
   wherein said inner wall is comprised primarily of a substantially cylindrical region and also includes a tapered region, the inner wall tapered region being located between the substantially cylindrical region of the inner wall and the inner wall seal at the base and having a diameter that decreases or remains constant from the inner wall substantially cylindrical region to the inner wall seal at the base;
   wherein said outer wall is comprised primarily of a substantially cylindrical region and also includes a tapered region, the outer wall tapered region being located between the substantially cylindrical region of the outer wall and the outer wall seal at the base and having a diameter that decreases or remains constant from the outer wall substantially cylindrical region to the outer wall seal at the base;
   wherein said inner wall is formed integrally with said base and said outer wall is coupled to said base by a first weld; and
   wherein said inner wall and said outer wall are both formed substantially of a polycarbonate material.

2. The vessel of claim 1, wherein said outer wall tapered region is configured with said base in such a manner as to define a circumferencial leash recess bounded above by said base and bounded on the inside and below by the outer wall, said vessel further comprising:
   a leash member coupled on one end to said removable cap member and anchored on the other end in said leash recess.

3. The vessel of claim 1, wherein said inner wall and said outer wall are substantially transparent.

4. The vessel of claim 1, wherein said resealable unit comprises a seal extension member formed integrally with said base that extends outward from said inner wall;
   wherein said outer wall is joined to an underside of said seal extension member by said first weld.

5. The vessel of claim 1, wherein said outer wall is formed of at least a top section and a bottom section, said top section being joined to said base and said bottom section being joined to said top section at a mid region of said outer wall vertically between said base and a bottom portion of said outer wall.

6. The vessel of claim 1, further comprising a supplemental surface member comprised at least in part of an elastomeric material provided on an exterior surface of said outer wall.

7. The vessel of claim 6, wherein said outer wall is configured to define a recess that receives at least in part said supplemental surface member.

8. The vessel of claim 6, wherein said outer wall is formed of at least a top section and a bottom section, said top section being joined by said first weld proximate said top portion of said inner wall and said bottom section being joined to said top section by a second weld;
   said second weld being substantially hidden from said exterior of said outer wall by said supplemental surface member.

9. The vessel of claim 1, wherein said insulative gap is substantially continuous proximate said inner wall.

10. A double walled liquid holding vessel, comprising:
    an inner wall having a contiguous bottom that is configured in such a manner as to define a cavity that holds liquid, said inner wall being comprised substantially of a polycarbonate material; and
    an outer wall provided about and substantially spaced from said inner wall to define an insulative gap between said inner wall and said outer wall, said outer wall being comprised substantially of a polycarbonate material and being coupled to said inner wall in such a manner that said insulative gap is air tight;

a supplemental surface member provided on an exterior surface of said outer wall that is comprised at least in part of an elastomeric material; and a resealable mechanism coupled to said inner wall at a top portion thereof that provides resealable access to said cavity, said resealable mechanism including a resealable cover member that is removably coupled to a base;

wherein said outer wall is comprised of at least a top section and a bottom section, and said top section is coupled via a first weld to said base and said bottom section is coupled to said top section via a second weld; and wherein said supplemental surface member is provided over said second weld to obscure said second weld from view.

11. The vessel of claim 10, wherein said inner wall and said outer wall are substantially transparent.

12. The vessel of claim 10, wherein said inner wall and said outer wall are substantially cylindrical in shape with a pronounced taper inward at the respective top portions thereof.

13. The vessel of claim 12, wherein said base and said pronounced taper of said outer wall are configured to define a circumferencial leash recess bounded above by said base and bounded on the inside and below by the outer wall, said vessel further comprising:

a leash member coupled on one end to said resealable cover member and anchored on the other end in said leash recess.

14. The vessel of claim 10, wherein the top section and the bottom section are two separately formed sections that are joined together at a mid region of said outer wall vertically between said resealable mechanism and a bottom portion of said outer wall.

15. The vessel of claim 10, wherein said outer wall is configured to define a weld recess proximate said second weld and said supplemental surface member is provided in said weld recess.

16. The vessel of claim 10, wherein said top section of the outer wall extends substantially the vertical length of the outer wall, the bottom section of the outer wall including a horizontally disposed and integrally formed outer wall bottom.

17. The vessel of claim 10, wherein said insulative gap between said inner wall and said outer wall is substantially continuous.

18. A double walled liquid holding vessel, comprising:

an inner wall with a contiguous bottom that is configured in such a manner as to define a cavity that holds liquid, said inner wall being comprised substantially of a polycarbonate resin material;

an outer wall provided about and substantially spaced from said inner wall to define an insulative gap between said inner wall and said outer wall, said outer wall being comprised substantially of a polycarbonate resin material and being coupled to said inner wall in such a manner that said insulative gap is air tight; and a resealable mechanism coupled to said inner wall at a top portion thereof that provides resealable access to said cavity;

wherein said insulative gap between said inner wall and said outer wall is substantially continuous;

wherein said outer wall is formed of at least a top section and a bottom section, said top section being joined proximate said top portion of said inner wall to said resealable mechanism and said bottom section being joined to said top section at a mid region of said outer wall vertically between said resealable mechanism and the contiguous bottom of said inner wall; and wherein the top and bottom sections of said outer wall are joined together by a weld, said weld being obscured by a supplemental surface member.

19. The vessel of claim 18, wherein said supplemental surface member is comprised at least in part of an elastomeric material.

20. The vessel of claim 18, wherein said polycarbonate material includes polycarbonate resin.

* * * * *